Figure 1:
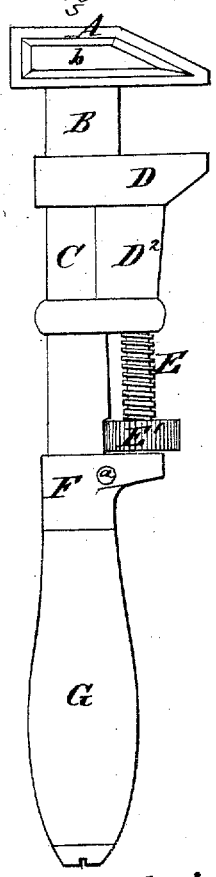

GEORGE C. TAFT.

Improvement in Wrenches.

No. 4,902.

Reissued May 14, 1872.

Witnesses.

Chas. H. Green

Ja. S. Wightman

Inventor

G. C. Taft by his atty

C. L. Kenwicky

AM. PHOTO-LITHOGRAPHIC CO. N.Y. (OSBORNE'S PROCESS.)

UNITED STATES PATENT OFFICE.

GEORGE C. TAFT, OF WORCESTER, MASSACHUSETTS, ASSIGNOR TO LORING COES, OF SAME PLACE.

IMPROVEMENT IN WRENCHES.

Specification forming part of Letters Patent No. 88,230, dated March 23, 1869; reissue No. 3,918, dated April 12, 1870; reissue No. 4,902, dated May 14, 1872.

*To all whom it may concern:*

Be it known that I, GEORGE C. TAFT, of the city and county of Worcester and State of Massachusetts, made an invention of certain new and useful Improvements in the Implement generally known as Coes' Wrench, for which improvements Letters Patent of the United States were granted to Loring Coes, of Worcester aforesaid, the 23d day of March, A. D. 1869; and that the following is a full, clear, and exact description and specification of the same.

The said improvements, which may be used separately or connectedly, consist, first, of the combination of a hammer-jaw shank, fixed to the handle of the wrench, and re-enforced at that portion along which the movable jaw slides with a movable jaw, and with a stationary operating-screw arranged between the movable jaw and the said handle; second, of the combination and arrangement of a re-enforced hammer-jaw shank, and an operating-screw for the movable jaw, held stationary as respects the shank, and a movable jaw constructed with side lips extending down over the sides of the shank, so as to hide from view not only the shoulder at the junction of the narrower and wider parts of such shank, but all of the space between such shoulder and the collar of the jaw-carrier; third, in constructing the movable jaw with a recessed chamber, and having shoulders or bearings adapted to the portions of the shank of different elevation, the same being used in combination with a re-enforced shank; fourth, in the arrangement of the stationary screw operating the movable jaw at the re-enforced side of the hammer-jaw shank, thereby permitting the milled head of the screw to be rotated without cutting away the shank to receive it, and making the movable jaw and the parts operating it lighter and more compact than would be possible where the re-enforced portion of the shank was at the opposite side thereof.

I am aware that re-enforced shanks have been heretofore used in other kinds of wrenches; and I do not, therefore, claim broadly this feature of the improvements, but restrict my claims to the new combinations I have produced, the first of which, it is believed, enables a stronger screw-slide wrench to be produced from a given quantity of material than any other plan of construction, because, while, on the one hand, the fixed jaw is firmly held by the re-enforcement of the shank in its immediate vicinity, the movable jaw, on the other hand, is firmly sustained by the screw intervening between it and the handle of the wrench.

In order that the invention may be fully understood, I have represented in the accompanying drawing, and will proceed to describe, a wrench embodying the same in the best form known to me at the date of the application for the original patent.

Figure 2:
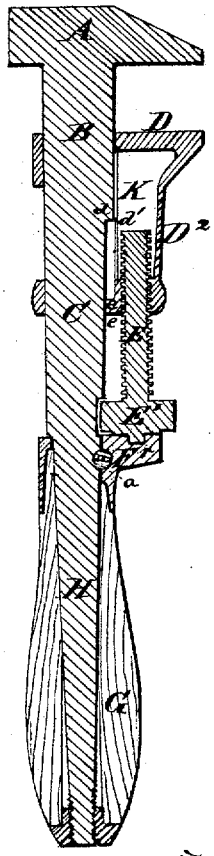
Figure 3:
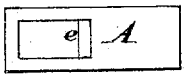
Figure 4:
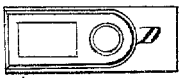
Figure 5:
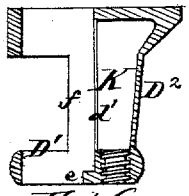
Figure 6:
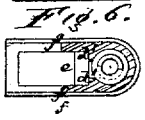

In said drawing, Figure 1 represents a side view of the complete wrench. Fig. 2 represents a longitudinal section of the same; Fig. 3, a top view of the same; Fig. 4, a view of the butt of the same. Fig. 5 represents a longitudinal section of the movable jaw and its appurtenances removed from the residue; and Fig. 6, a transverse section of the same.

In the drawing, A denotes the head, stationary, or hammer-jaw, as it is usually styled, the same having the shank B C H extended from it in manner as represented, and having the handle of the wrench fixed to its end. The upper portion B of the said shank, or that part of it along which the movable jaw D is to slide, is re-enforced by being made wider than the part C on which the collar $D^1$ of the movable jaw-carrier $D^2$ is to slide, the projection of the part B beyond the part C forming at their junction a shoulder, *d*. The hammer-jaw or head A is recessed on either or each of its opposite sides, as shown at *b*, in Fig. 1. The head and the shank, when formed by being cast together in a mold, so as to be in one piece of metal, such as is termed malleable cast-iron, are liable to break away from each other by unequal contraction during the process of solidifying from the molten state. To obviate or prevent this, or render it less likely to occur, the head is to be recessed in manner substantially as above mentioned. By reducing the bar or shank, as shown at C, metal is saved without materially affecting the strength of the wrench on the part most liable to breakage—viz., that part marked B—which usually extends between the jaws while the wrench is in use. The movable jaw-carrier is chambered, as shown at K, there being in front of the chamber shoulders or bearings *d′ d′* to bear against the face of the part B, and also a third shoulder or bearing, *e*, to bear against the part C of the shank or bar. The chamber K, in its transverse section, is made, by preference, larger than that of the operating-screw E, and a female screw is cut in the lower part of the carrier to receive the said screw E. This latter screw is provided with a milled head, E′, and is pivoted in a socket, *r*, formed in the ferrule F, the milled head being engaged in a recess formed in the shank C, so that the screw is stationary, as respects said shank, while it is between the movable jaw and the handle of the wrench. The ferrule, formed as represented, with a projecting and socketed arm, is secured to the shank by a pin, *a*, extending transversely through the ferrule, and through a recess formed in the adjacent side of the shank, (see Fig. 2.) The pin not only secures the ferrule to the shank, but operates to prevent the former from being pressed back on the shank and against the wooden handle G, so as to injure the latter or disturb its true relation with the shank. The movable jaw-carrier is also provided with two lips, *f f*, extended from the bearings or shoulders *d′ d′* to or so as to lap over the opposite sides of the part C in order to cover and hide from view the space within the carrier that would otherwise appear directly below the shoulder *d*. These lips also prevent dirt or extraneous matters from getting into the chamber K and thereby doing injury to the screws and the bearing parts of the carrier and the shank. In the said wrench the broader part of the shank projects beyond the residue at the side of the shank at which, also, the wrench-jaws project, and this location of the projection, although not essential to the invention, is, nevertheless, believed to be the best in a wrench having the operating-screw arranged between the movable jaw and the handle at the side of the shank at which the movable jaw projects, because the operating-screw can then be set close to the plane of the face of the shank from which the jaws project without materially reducing the shank near the ferrule by recessing it there for the reception of the milled head of the screw. If the broader part B of the shank projected over the residue at the opposite side of the shank, the screw must either be set further from the face of the shank at which the movable jaws project, or the shank must be more deeply recessed for the reception of the milled head, and be thereby weakened.

Having thus described a wrench embodying my improvements, what I claim as my invention, and desire to secure by Letters Patent, is—

1. A wrench, combining in its construction the following elements: A re-enforced hammer-jaw shank, fixed to the handle of the wrench, and re-enforced at that portion along which the movable jaw slides, the movable jaw, and the stationary operating-screw, substantially as before set forth.

2. The combination and arrangement of the hammer-jaw shank, constructed with a broader portion, B, stationary operative-screw, E, and the movable jaw D, constructed with side lips, forming a chamber to cover the shoulder *d*, substantially as set forth.

3. In combination with the re-enforced shank of the hammer-jaw, the movable jaw D, when constructed with a chamber, K, and having shoulders or bearings *d′ d′* to bear against the part B, and a shoulder or bearing, *e*, to bear against the part C of the shank.

4. The arrangement of the stationary screw and female screw in the movable jaw at the re-enforced side of the hammer-jaw shank, substantially as set forth.

In testimony whereof I have hereto set my hand this 14th day of October, A. D. 1870.

GEO. C. TAFT.

Witnesses:
A. H. KUTH,
H. S. SMITH.